United States Patent
Harren et al.

(10) Patent No.: US 7,728,079 B2
(45) Date of Patent: Jun. 1, 2010

(54) HYDROLYTICALLY STABLE POSTCROSSLINKED SUPERABSORBENTS

(75) Inventors: Jörg Harren, Krefeld (DE); Jörg Issberner, Willich-Neersen (DE); Mirko Walden, Herten (DE); Rainer Teni, Moers (DE); Franck Furno, Krefeld (DE); Peter Werle, Gelnhausen (DE); Hans-Peter Krimmer, Kirchweidach (DE)

(73) Assignee: Evonik Degussa GmbH, Dusseldorf (DE)

( * ) Notice: Subject to any disclaimer, the term of this patent is extended or adjusted under 35 U.S.C. 154(b) by 0 days.

(21) Appl. No.: 11/885,250

(22) PCT Filed: Feb. 24, 2006

(86) PCT No.: PCT/EP2006/060250

§ 371 (c)(1),
(2), (4) Date: Jan. 25, 2008

(87) PCT Pub. No.: WO2006/094907

PCT Pub. Date: Sep. 14, 2006

(65) Prior Publication Data

US 2008/0214740 A1 Sep. 4, 2008

(30) Foreign Application Priority Data

Mar. 5, 2005 (DE) .................. 10 2005 010 198

(51) Int. Cl.
*C08F 8/30* (2006.01)
(52) U.S. Cl. .................. 525/375; 525/329.7; 525/330.3; 525/383; 525/371
(58) Field of Classification Search .............. 525/329.7, 525/330.3, 383, 375, 371
See application file for complete search history.

(56) References Cited

U.S. PATENT DOCUMENTS

| | | | |
|---|---|---|---|
| 4,076,663 A | 2/1978 | Masuda | |
| 4,131,576 A | 12/1978 | Iovine | |
| 4,179,367 A | 12/1979 | Barthell | |
| 4,286,082 A | 8/1981 | Tsubakimoto | |
| 4,340,706 A | 7/1982 | Obayashi | |
| 4,587,308 A * | 5/1986 | Makita et al. | 525/373 |
| 5,409,771 A | 4/1995 | Dahmen et al. | |
| 5,610,220 A | 3/1997 | Klimmek | |
| 5,672,633 A | 9/1997 | Brehm | |
| 5,712,316 A | 1/1998 | Dahmen | |
| 6,060,557 A | 5/2000 | Dahmen | |
| 6,403,700 B1 | 6/2002 | Dahmen | |
| 6,576,713 B2 * | 6/2003 | Ishizaki et al. | 525/329.7 |
| 6,623,848 B2 | 9/2003 | Brehm | |
| 6,657,015 B1 | 12/2003 | Riegel et al. | |
| 6,911,572 B1 | 6/2005 | Bruhn | |
| 6,958,429 B2 | 10/2005 | Bruhn | |
| 7,026,373 B2 | 4/2006 | Smith | |
| 7,101,946 B2 | 9/2006 | Brehm | |
| 2005/0171235 A1 | 8/2005 | Harren | |
| 2006/0029782 A1 * | 2/2006 | Harren et al. | 428/212 |
| 2006/0057375 A1 | 3/2006 | Harren | |
| 2006/0057389 A1 | 3/2006 | Reimann | |
| 2007/0260357 A1 | 11/2007 | Issberner | |

FOREIGN PATENT DOCUMENTS

| | | |
|---|---|---|
| CA | 2 426 514 | 3/2003 |
| EP | 0 288 865 | 4/1988 |
| EP | 0 695 763 | 2/1996 |
| EP | 0 695 763 A1 * | 2/1996 |
| JP | 57-063314 | 4/1982 |
| WO | WO 99/34843 | 7/1999 |
| WO | WO 2008/006661 | 1/2008 |

OTHER PUBLICATIONS

English language abstract for JP 57-063314 listed as document B1 above.
International Preliminary Report on Patentability for PCT/EP2006/060250.
English abstract for EP 0 288 865 cited as B4 above.
Patent Abstracts of Japan, Publication No. 57063314, Apr. 16, 1982.
Written Opinion of the International Searching Authority for PCT/EP2006/060250.
International Search Report for PCT/EP2006/060250.

* cited by examiner

*Primary Examiner*—Ling-Siu Choi
(74) *Attorney, Agent, or Firm*—Law Offices of: Michael A. Sanzo, LLC

(57) ABSTRACT

The present invention relates to a process for producing postcrosslinked water-absorbing polymeric formations, comprising the steps of contacting water-absorbing polymeric formations $P_1$ obtained by polymerization of ethylenically unsaturated acid-functional monomers or salts thereof in the presence of a crosslinker with a fluid $F_1$ comprising a postcrosslinker,
heating the water-absorbing polymeric formations in contact with the fluid $F_1$ to a temperature in a range from 40 to 300° C. to obtain postcrosslinked water-absorbing polymeric formations $P_2$,
the water-absorbing polymeric formations $P_1$ having a thermal stability, as determined in accordance with the test method described herein, of less than 3.0%. The invention also relates to water-absorbing polymeric formations, to the water-absorbing polymeric formations obtainable by this process, to water-absorbing polymeric formations based on crosslinked carboxyl-bearing monomers, to a composite comprising water-absorbing polymeric formations and a substrate, to a process for producing a composite, to a composite obtainable by this process, to chemical products comprising water-absorbing polymeric formations or a composite, to the use of water-absorbing polymeric formations or of a composite in chemical products and also to the use of triallyl isocyanurate as an internal crosslinker in the production of water-absorbing polymeric formations based on crosslinked carboxyl-bearing monomers.

19 Claims, No Drawings

HYDROLYTICALLY STABLE POSTCROSSLINKED SUPERABSORBENTS

CROSS REFERENCE TO RELATED APPLICATIONS

The present application represents U.S. national stage of international application PCT/EP2006/060250, which had an international filing date of Feb. 24, 2006, and which was published in English under PCT Article 21(2) on Sep. 14, 2006. Priority is also claimed, through the international application, to German application 10 2005 010 198.4, filed on Mar. 5, 2005. These prior applications are incorporated in their entirety herein by reference.

The present invention relates to a process for producing postcrosslinked water-absorbing polymeric formations, to the water-absorbing polymeric formations obtainable by this process, to water-absorbing polymeric formations based on crosslinked carboxyl-bearing monomers, to a composite comprising water-absorbing polymeric formations and a substrate, to a process for producing a composite, to a composite obtainable by this process, to chemical products comprising water-absorbing polymeric formations or a composite, to the use of water-absorbing polymeric formations or of a composite in chemical products and also to the use of triallyl isocyanurate as an internal crosslinker in the production of water-absorbing polymeric formations based on crosslinked carboxyl-bearing monomers.

Superabsorbents are water-insoluble crosslinked polymers capable, by swelling and forming hydrogels, of taking up, and retaining under a certain pressure, large amounts, usually more than 10 times and often more than 50 times their own weight, of aqueous fluids, in particular body fluids, preferably urine or blood. By virtue of these characteristic properties, these polymers are mainly used in hygiene articles, such as baby diapers, incontinence products or sanitary napkins.

The current commercial superabsorbents are in essence particulate or fibrous crosslinked polyacrylic acids or crosslinked starch-acrylic acid graft polymers wherein the carboxyl groups are partly neutralized with aqueous sodium hydroxide or potassium hydroxide solution.

Superabsorbents are produced by free-radical polymerization of preferably monoethylenically unsaturated carboxylic acids, such as acrylic acid and its alkali metal salts, in aqueous solution or by the processes of inversion suspension or emulsion polymerization as described in U.S. Pat. No. 4,286,082, DE 27 06 135, U.S. Pat. No. 4,340,706, DE 37 13 601 and DE 28 40 010. Crosslinkers are included in the monomer solution which are frequently compounds having two or more ethylenically unsaturated groups or compounds having two or more functional groups capable of reacting with the carboxylic acid groups in an addition reaction or in a ring-opening reaction, the crosslinking in the water-absorbing polymeric formations of the polymeric chains based on the monoethylenically unsaturated carboxylic acids being based on ester groups in general.

Polymers having different absorbent properties can be produced through the choice of monomer composition, of the crosslinker, of the polymerization conditions and also of the processing conditions for the hydrogel obtained after the polymerization. Further possibilities are offered by the production of graft polymers, for example by using chemically modified starch, cellulose and polyvinyl alcohol as described in DE-OS 26 12 846 and the aftertreatment of the hydrogels or of the pulverulent polymeric formations obtained after the drying of the hydrogels, by postcrosslinking the surfaces, for example as described in DE 40 20 780 C1. Postcrosslinking the surface of the water-absorbing polymeric formations enhances in particular the absorbency of the polymeric formations under applied pressures.

The drying of the hydrogels obtained after the polymerization and also the postcrosslinking carried out after the drying, if appropriate, constitute a high thermal stress on the polymers which leads to a not inconsiderable hydrolysis of the crosslinking ester groups. As a result of the at least partial hydrolysis taking place, the level of extractable fractions increases, leading to a deterioration in polymer overall performance. Furthermore, when the water-absorbing polymeric formations are used in hygiene articles, these soluble constituents may lead to skin irritations for the wearer of the hygiene article.

The present invention has for its general object to overcome the prior art disadvantages.

It is an object of the present invention to indicate a process whereby water-absorbing polymeric formations possessing high absorbency under a confining pressure can be produced and in addition are characterized by a low level of soluble fractions, especially by a very low residual monomer content, compared with conventional superabsorbents.

It is a further object of the present invention to provide water-absorbing polymeric formations and also a composite comprising these water-absorbing polymeric formations that exhibit particularly good skin compatibility and also excellent absorbent properties.

A contribution to achieving the aforementioned objects is made by a process for producing postcrosslinked water-absorbing polymeric formations, comprising the steps of contacting water-absorbing polymeric formations $P_1$ obtained by polymerization of ethylenically unsaturated acid-functional monomers or salts thereof in the presence of a crosslinker with a fluid $F_1$ comprising a postcrosslinker, heating the water-absorbing polymeric formations $P_1$ in contact with the fluid $F_1$ to a temperature in a range from 40 to 300° C., preferably from 80 to 275° C. and more preferably from 125 to 250° C., to obtain postcrosslinked water-absorbing polymeric formations $P_2$, the water-absorbing polymeric formations $P_1$ having a thermal stability, as determined in accordance with the test method described herein, of less than 3.0%, preferably less than 2.0%, more preferably less than 1.0% and most preferably less than 0.5%.

It is further preferable that the water-absorbing polymeric formations $P_1$ brought into contact with the fluid $F_1$ are heated to the aforementioned temperatures for not more than 3 hours, preferably for not more than 2 hours, more preferably for not more than 1 hour and most preferably for not more than 30 minutes.

As used herein, "thermal stability" is defined as the quotient formed from the difference in the retainability of the water-absorbing polymeric particles before (=retention$_{(before\ heating)}$) and after (=retention$_{(after\ heating)}$) heating at 180° C. for 30 minutes and the retainability before heating at 180° C. for 30 minutes, stated in %:

$$\text{Thermal stability} = \frac{Retention_{(after\ heating)} - Retention_{(before\ heating)}}{Retention_{(before\ heating)}} \times 100\%$$

Water-absorbing polymeric formations $P_1$ preferred according to the present invention are fibres, foams or particles, with fibres and particles being preferred and particles being particularly preferred. Water-absorbing polymeric formations $P_2$ in these forms are obtained by using fibres, foams or particles as appropriate as water-absorbing polymeric formations $P_1$.

Water-absorbing polymeric fibres preferred according to the present invention are dimensioned so that they are incorporable into or as yarns for textiles and also directly into textiles. It is preferable according to the present invention that the water-absorbing polymeric fibres have a length in the range from 1 to 500 mm, preferably in the range from 2 to 500 mm and more preferably in the range from 5 to 100 mm and a diameter in the range from 1 to 200 denier, preferably in the range from 3 to 100 denier and more preferably in the range from 5 to 60 denier.

Water-absorbing polymeric particles particularly preferred according to the present invention are dimensioned so that they have an ERT 420.1-02 (ERT=EDANA Recommended Test Method) particle size in the range from 10 to 3000 μm, preferably in the range from 20 to 2000 μm and more preferably in the range from 150 to 850 μm, the weight average of the particle size preferably being in a range from 200 to 600 μm.

The water-absorbing polymeric formation $P_1$ used in the process of the present invention is preferably a polymeric formation based on (α1) 20-99.999% by weight, preferably 55% to 98.99% by weight and more preferably 70% to 98.79% by weight of polymerized ethylenically unsaturated acid-functional monomers or salts thereof or polymerized ethylenically unsaturated monomers containing a protonated or quaternized nitrogen, or mixtures thereof, mixtures comprising at least ethylenically unsaturated acid-functional monomers, preferably acrylic acid, being particularly preferred, (α2) 0-80% by weight, preferably 0-44.99% by weight and more preferably 0.1-44.89% by weight of polymerized monoethylenically unsaturated monomers copolymerizable with (α1), (α3) 0.001-5% by weight, preferably 0.01-3% by weight and more preferably 0.01-2.5% by weight of one or more crosslinkers, (α4) 0-30% by weight, preferably 0-5% by weight and more preferably 0.1-5% by weight of a water-soluble polymer, (α5) 1% to 30% by weight, preferably 1.5% to 20% by weight and more preferably 3% to 15% by weight of water, and also (α6) 0-20% by weight, preferably 0% to 10% by weight and more preferably 0.1-8% by weight of one or more auxiliaries, the sum total of the weight quantities (α1) to (α6) being 100% by weight.

The monoethylenically unsaturated acid-functional monomers (α1) may be in a partially or fully, preferably partially, neutralized state. The degree of neutralization of the monoethylenically unsaturated acid-functional monomers is preferably not less than 25 mol %, more preferably not less than 50 mol % and, moreover, preferably in the range from 50 to 80 mol %. Reference is made in this connection to DE 195 29 348 A1, the disclosure of which is hereby incorporated herein by reference. The neutralizing may also be effected, partly or wholly, after the polymerization. Furthermore, the neutralizing may be effected using alkali metal hydroxides, alkaline earth metal hydroxides, ammonia and also carbonates and dicarbonates. In addition to those mentioned, any further base may be used that is capable of forming a water-soluble salt with the acid. Mixed neutralization with various bases is possible as well. Preference is given to neutralizing with ammonia and alkali metal hydroxides and particular preference to neutralizing with sodium hydroxide and with ammonia.

Furthermore, a polymer may have a preponderance of free acid groups, so that it has an acidic pH. This acidic water-absorbing polymer may be at least partially neutralized by means of a polymer having free basic groups, preferably amine groups, which is alkaline compared with the acidic polymer. These polymers are identified in the literature as mixed bed ion exchange absorbent (MBIEA) polymers and are disclosed inter alia in WO 99/34843 A1. The disclosure of WO 99/34843 A1 is hereby incorporated herein by reference. In general, MBIEA polymers constitute a composition comprising both alkaline polymers capable of exchanging anions and a polymer which is acidic compared with the alkaline polymer and capable of exchanging cations. The alkaline polymer possesses alkaline groups and is typically obtained by the addition polymerization of monomers bearing alkaline groups or groups capable of conversion into alkaline groups. These monomers are primarily those comprising primary, secondary or tertiary amines or the corresponding phosphines or two or more of the foregoing functional groups. This group of monomers includes in particular ethyleneamine, allylamine, diallylamine, 4-aminobutene, alkyloxycyclines, vinylformamide, 5-aminopentene, carbodiimide, formaldacine, melamine and the like, and also their secondary or tertiary amine derivatives.

The ethylenically unsaturated acid-functional monomers (α1) are preferably those compounds which are mentioned as ethylenically unsaturated acid-functional monomers (α1) in WO 2004/037903 A1, hereby incorporated herein by reference. Particularly preferred ethylenically unsaturated acid-functional monomers (α1) are acrylic acid and methacrylic acid, and acrylic acid is most preferred.

Preferred monoethylenically unsaturated monomers (α2) copolymerizable with (α1) are acrylamides and methacrylamides.

Preferred (meth)acrylamides include not only acrylamide and methacrylamide but also alkyl-substituted (meth)acrylamides or aminoalkyl-substituted derivatives of (meth)acrylamide, such as N-methylol(meth)acrylamide, N,N-dimethylamino(meth)acrylamide, dimethyl(meth)acrylamide or diethyl(meth)acrylamide. Possible vinylamides are for example N-vinylamides, N-vinylformamides, N-vinylacetamides, N-vinyl-N-methylacetamides, N-vinyl-N-methylformamides, vinylpyrrolidone. Of these monomers, acrylamide is particularly preferred.

Water-dispersible monomers are further preferred as monoethylenically unsaturated monomers (α2) copolymerizable with (α1). Preferred water-dispersible monomers are acrylic esters and methacrylic esters, such as methyl (meth)acrylate, ethyl (meth)acrylate, propyl (meth)acrylate or butyl (meth)acrylate, and also methyl polyethylene glycol (meth)acrylate, methyl polyethylene glycol allyl ether, vinyl acetate, styrene and isobutylene.

Preferred crosslinkers (α3) are the compounds identified as crosslinkers (α3) in WO 2004/037903 A1.

A particularly preferred embodiment of the process of the present invention utilizes, as water-absorbing polymeric formations $P_1$, polymeric formations based on compounds of the structure I

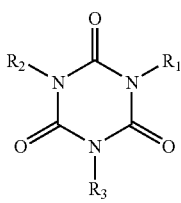

Structure I as crosslinkers (α3), where $R_1$, $R_2$ and $R_3$ may be the same or different and represent an ethylenically unsaturated hydrocarbon having 2 to 20 carbon atoms, which may if appropriate be attached via a polyethylene oxide or polypropylene oxide group having 1 to 200, preferably 10 to 150 and more preferably 20 to 100 ethylene oxide or propylene oxide, respectively, units to the nitrogen atom, preferably 3 to 15 carbon atoms and more preferably 3 to 6 carbon atoms. Of these crosslinkers, particular preference is given to the crosslinker wherein the groups $R_1$, $R_2$ and $R_3$ represent an allyl radical of the structure II

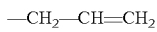
—$CH_2$—$CH$=$CH_2$

Structure II.

This crosslinker is known under the names of triallyl isocyanurate, 1,3,5-triallyl isocyanurate, 1,3,5-triallyl isocyanuric acid, triallyl-s-triazine-2,4,6-(1H, 3H, 5H)trione, isocyanuric acid triallyl ester or 1,3,5-tri-2-propenyl-1,3,5-triazine-2,4,6(1H, 3H, 5H)trione. The advantage of the crosslinker triallyl isocyanurate resides not only in the thermal stability of the polymers cross-linked by this crosslinker but in particular also in its low toxicity, in its good solubility in water and also in its low volatility.

The crosslinker of the structure I can also be used in combination with other crosslinkers, in particular in combination with the compounds mentioned as crosslinkers (α3) in WO 2004/037903 A1, as an internal crosslinker, in which case it is particularly preferable that the weight ratio between the crosslinker of the structure I and the other crosslinker is not greater than 1:1 and preferably less than 1:1.5, more preferably less than 1:2, even more preferably less than 1:2.5, yet even more preferably less than 1:3 and most preferably less than 1:4.

Especially when using crosslinkers of the structure I, it is further preferable that the water-absorbing polymeric formations $P_1$ be obtained by polymerization of the aforementioned ethylenically unsaturated acid-functional monomers or salts thereof not only in the presence of the crosslinker but also in the presence of less than 1% by weight and preferably less than 0.01% by weight, each percentage being based on the component (α1), but most preferably in the absence of a surface-active agent, especially Softanol 70.

Useful water-soluble polymers (α4) for inclusion in the water-absorbing polymeric formations $P_1$ include water-soluble addition polymers, such as partially or fully saponified polyvinyl alcohol, polyvinylpyrrolidone, starch or starch derivatives, polyglycols or polyacrylic acid. The molecular weight of these polymers is not critical as long as they are water-soluble. Preferred water-soluble polymers are starch or starch derivatives or polyvinyl alcohol. the water-soluble polymers, preferably synthetic ones such as polyvinyl alcohol, may also serve as a grafting base for the monomers to be polymerized.

The water-absorbing polymeric formations $P_1$ may include standardizing agents, odour-trappers, surface-active agents or antioxidants as auxiliary entities (α6). Furthermore, auxiliary entities present in the water-absorbing polymeric formations $P_1$ are preferably those components other than the monomers (α1) and (α2) to be polymerized, the crosslinkers (α3) and the water-soluble polymers (α4) present, if appropriate, that are used for the free-radical polymerization. These components include in particular the initiators and also, if appropriate, chain regulators.

A particular embodiment of the process of the present invention utilizes, as water-absorbing polymeric formations $P_1$, polymeric formations based to not less than 50% by weight, preferably to not less than 70% by weight and more preferably to not less than 90% by weight on monomers containing carboxylate groups, the weight percentages being based on the components of the water-absorbing polymeric formations $P_1$ other than water. It is further preferable in accordance with the present invention that the component (α1) consist to not less than 50% by weight and preferably to not less than 70% by weight of an acrylic acid neutralized to an extent which is preferably not less than 20 mol %, more preferably to an extent which is not less than 50 mol % and even more preferably to an extent in a range from 60 to 85 mol %.

The water-absorbing polymeric formations $P_1$ can be formed from the aforementioned monomers and crosslinkers by various methods of polymerization. Suitable examples in this connection include bulk polymerization, preferably carried out in kneading reactors such as extruders, solution polymerization, spray polymerization, inverse emulsion polymerization and inverse suspension polymerization. Solution polymerization is preferably carried out in water as solvent.

Solution polymerization may be carried out as a continuous operation or as a batch operation. There is extensive prior art concerning possible variations with regard to reaction conditions such as temperatures, identity and amount of the initiators but also of the reaction solution. Typical processes are described in the following patents: U.S. Pat. No. 4,286,082, DE 27 06 135, U.S. Pat. No. 4,076,663, DE 35 03 458, DE 40 20 780, DE 42 44 548, DE 43 23 001, DE 43 33 056, DE 44 18 818. The disclosures are hereby incorporated herein by reference.

In an inverse suspension or emulsion polymerization, an aqueous partially neutralized acrylic acid solution is dispersed by means of protective colloids or emulsifiers in a hydrophobic organic solvent and the polymerization started by means of free-radical initiators. After the polymerization has ended, the water is removed from the reaction mixture by azeotropic distillation and the polymer product is filtered off and dried. The crosslinking reaction may be effected by interpolymerizing a polyfunctional crosslinker, dissolved in the monomer solution, and/or by reacting suitable crosslinking agents with functional groups on the polymer during one of the production steps. The process principle is described for example in U.S. Pat. No. 4,340,706, DE 37 13 601 and DE 28 40 010.

The polymerization is initiated in the generally customary fashion, by using an initiator. Useful initiators for initiating the polymerization include all initiators customarily used in the production of superabsorbents and capable of forming free radicals under the polymerization conditions. Initiation of the polymerization through the action of electron beams on the polymerizable aqueous mixture is also possible. However, the polymerization may also be initiated in the absence of initiators of the abovementioned kind, through the action of high-energy radiation in the presence of photoinitiators. Polymerization initiators may be present in a dissolved or dispersed state in a solution of monomers according to the present invention. Useful initiators include all compounds known to one skilled in the art and splitting into free radicals. This definition includes in particular the initiators already mentioned in WO 2004/037903 A1 as possible initiators.

It is particularly preferable to use a redox system consisting of hydrogen peroxide, sodium peroxodisulphate and ascorbic acid for preparing the water-absorbing polymeric formations $P_1$.

The hydrogel obtained after the polymerization is preferably dried at temperatures which are typically in the range from 80 to 200° C. Especially when using the cross-linkers of the structure I, drying temperatures in a range from 100 to 200° C., more preferably of more than 125° C. and even more preferably of more than 150° C. are possible without incurring any significant hydrolysis of the superabsorbent polymer network.

Drying is preferably carried out in conventional ovens or dryers, for example in belt dryers, tray dryers, rotary tube ovens, fluidized bed dryers, pan dryers, paddle dryers or infrared dryers. If the dried polymers thus obtained are still not in particulate form, they have to be comminuted after drying. Comminution is preferably effected by dry grinding, preferably by dry grinding in a hammer mill, a pin mill, a ball mill or a roll mill. After comminution, it is further preferred that the polymeric formations have a particle size, determined by sieving analysis, of not more than 1000 µm and more preferably of not more than 850 µm, the weight average of the particle size preferably being in a range from 200 to 600 µm.

In accordance with the present invention, it is particularly preferable for the water-absorbing polymeric formation $P_1$ used to be a crosslinked polyacrylate in particulate form that was obtained by polymerization of an acrylic acid and in the presence of a crosslinker of the structure I, most preferably triallyl isocyanurate, in an aqueous solution comprising the acrylic acid in an amount in the range from 5% to 80% by weight, preferably from 10% to 70% by weight and more preferably from 20% to 50% by weight, based on the weight of the aqueous solution, and subsequent comminution of the resulting hydrogel, drying of the comminuted hydrogel to a water content in the range from 1% to 50% by weight, preferably from 2.5% to 40% by weight and more preferably from 5% to 30% by weight and, if appropriate, further grinding of the dried hydrogel.

Useful postcrosslinkers include all postcrosslinking agents known to one skilled in the art for postcrosslinking water-absorbing polymeric formations based on partially neutralized carboxylic acid monomers. These postcrosslinkers are typically compounds having two or more functional groups capable of reacting with functional groups of the monomers (α1) or (α2) in a condensation reaction (=condensation crosslinkers), in an addition reaction or in a ring-opening reaction (postcrosslinker class A) or are polyvalent metal cations (postcrosslinker class B).

The functional groups of compounds of postcrosslinker class A are preferably alcohol, amine, aldehyde, glycidyl, isocyanate, carbonate or epichloro functions.

Examples of compounds of postcrosslinker class A are polyols, for example ethylene glycol, polyethylene glycols such as diethylene glycol, triethylene glycol and tetraethylene glycol, propylene glycol, polypropylene glycols such as dipropylene glycol, tripropylene glycol or tetrapropylene glycol, 1,3-butanediol, 1,4-butanediol, 1,5-pentanediol, 2,4-pentanediol, 1,6-hexanediol, 2,5-hexanediol, glycerol, polyglycerol, trimethylolpropane, polyoxypropylene, oxyethylene-oxypropylene block copolymers, sorbitan fatty acid esters, polyoxyethylene sorbitan fatty acid esters, pentaerythritol, polyvinyl alcohol and sorbitol, amino alcohols, for example ethanolamine, diethanolamine, triethanolamine or propanolamine, polyamine compounds, for example ethylenediamine, diethylenetriamine, triethylenetetraamine, tetraethylenepentaamine or pentaethylenehexaamine, polyglycidyl ether compounds such as ethylene glycol diglycidyl ether, polyethylene glycol diglycidyl ether, glyceryl diglycidyl ether, glyceryl polyglycidyl ether, pentaerythrityl polyglycidyl ether, propylene glycol diglycidyl ether, polypropylene glycol diglycidyl ether, neopentylglycol diglycidyl ether, hexanediol glycidyl ether, trimethylolpropane polyglycidyl ether, sorbityl polyglycidyl ether, diglycidyl phthalate, diglycidyl adipate, 1,4-phenylenebis(2-oxazoline), glycidol, polyisocyanates, preferably diisocyanates such as 2,4-tolylene diisocyanate and hexamethylene diisocyanate, polyaziridine compounds such as 2,2-bishydroxymethylbutanol tris[3-(1-aziridinyl)propionate], 1,6-hexamethylenediethyleneurea and diphenylmethane-bis-4,4'-N,N'-diethyleneurea, haloepoxides for example epichloro- and epibromohydrins and α-methylepichlorohydrin, alkylene carbonates such as 1,3-dioxolan-2-one (ethylene carbonate), 4-methyl-1,3-dioxolan-2-one (propylene carbonate), 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, 1,3-dioxolan-2-one, poly-1,3-dioxolan-2-one, polyquaternary amines such as condensation products of dimethylamines and epichlorohydrin. Preferred compounds of postcrosslinker class A further include polyoxazolines such as 1,2-ethylenebisoxazoline, postcrosslinkers having silane groups such as γ-glycidoxypropyltrimethoxysilane and γ-aminopropyltrimethoxysilane, oxazolidinones such as 2-oxazolidinone, bis- and poly-2-oxazolidinones and diglycol silicates.

Of these compounds, particularly preferred postcrosslinkers of postcrosslinker class A are condensation crosslinkers such as for example diethylene glycol, triethylene glycol, polyethylene glycol, glycerol, polyglycerol, propylene glycol, diethanolamine, triethanolamine, polyoxypropylene, oxyethylene-oxypropylene block copolymers, sorbitan fatty acid esters, polyoxyethylene sorbitan fatty acid esters, trimethylolpropane, pentaerythritol, polyvinyl alcohol, sorbitol, 1,3-dioxolan-2-one (ethylene carbonate), 4-methyl-1,3-dioxolan-2-one (propylene carbonate), 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one, 1,3-dioxolan-2-one, poly-1,3-dioxolan-2-one.

Ethylene carbonate is particularly preferred for use as a postcrosslinker of postcrosslinker class A.

The polyvalent metal cations of postcrosslinker class B are preferably derived from bi- or tervalent cations. Preferred bivalent cations are derived from zinc, beryllium, alkaline earth metals, such as magnesium, calcium, strontium, of which magnesium is preferred. More highly valent cations further useful in the present invention are cations of aluminium, iron, chromium, manganese, titanium, zirconium and other transition metals and also double salts of such cations or mixtures thereof. Preference is given to using aluminium salts and alums and their different hydrates such as for example $AlCl_3 \times 6H_2O$, $NaAl(SO_4)_2 \times 12\ H_2O$, $KAl(SO_4)_2 \times 12\ H_2O$ or $Al_2(SO_4)_3 \times 14\text{-}18\ H_2O$.

$Al_2(SO_4)_3$ and its hydrates are most preferred for use as postcrosslinkers of postcrosslinker class B.

The amount in which the postcrosslinker is used in the process of the present invention is preferably in the range from 0.01% to 20% by weight, more preferably in the range from 0.1% to 10% by weight and even more preferably in the range from 0.2% to 5% by weight, based on the water-absorbing polymeric formation $P_1$.

Especially when the postcrosslinker is not liquid under the pressure and temperature conditions of the postcrosslinking operation, the postcrosslinker is used in the form of a fluid $F_1$ comprising the postcrosslinker and a solvent, the solvent used preferably being water, a water-miscible organic solvent such as for example methanol, ethanol, 1-propanol, 2-propanol or 1-butanol, or else a mixture of water and such organic solvent. The postcrosslinker, if used together with a solvent, is present in the fluid $F_1$ in an amount which is preferably in a range from 5% to 75% by weight, more preferably in a range from 20% to 40% by weight and most preferably in a range from 5% to 25% by weight, all percentages being based on the total weight of fluid $F_1$.

The contacting of the fluid $F_1$ with the water-absorbing polymeric formation $P_1$ is preferably effected in a conventional mixing assembly such as for example a Patterson-Kelley mixer, a DRAIS turbulent mixer, a Lodige mixer, a Ruberg mixer, a screw mixer, a pan mixer and a fluidized bed mixer and also in a continuous upright mixer in which the polymeric formation is mixed by rotating blades at fast frequency (Schugi mixer).

After the fluid $F_1$ has been brought into contact with the water-absorbing polymeric formation $P_1$, the post-crosslinking reaction takes place in the process of the present invention by heating the water-absorbing polymeric formation to temperatures in the range from 40 to 300° C., preferably in the range from 80 to 275° C. and more preferably in the range from 125 to 250° C. In one particular embodiment of the process according to the present invention, the water-absorbing polymeric formations $P_1$ brought into contact with the fluid $F_1$ are heated to a temperature of not less than 150° C. The best postcrosslinking time for the individual postcrosslinker types is easy to determine. One constraint on postcrosslinking time is that the performance profile desired for the water-absorbing polymeric formation is destroyed again by heat damage, although especially when using crosslinkers of the structure I as internal crosslinkers for the water-absorbing polymeric formation $P_1$ (component ($\alpha$3)) even comparatively high postcrosslinking temperatures, in particular postcrosslinking temperatures of more than 150° C. and more preferably more than 175° C. can be maintained. The thermal treatment can be carried out in customary dryers or ovens, examples being rotary tube ovens, fluidized bed dryers, pan dryers, paddle dryers or infrared dryers.

In accordance with the present invention, it is further preferable that, as a consequence of the thermal treatment, the outer region of the water-absorbing polymeric formations $P_1$ is more strongly crosslinked than the inner region.

In another embodiment of the process according to the present invention, the outer region of the water-absorbing polymer formations $P_1$ is brought into contact with a compound comprising tervalent cations, preferably $Al^{3+}$ ions, before or after, preferably after, the contacting with the fluid $F_1$ comprising the postcrosslinker. It is preferable that the compound comprising the tervalent cations be brought into contact with the polymeric formations in an amount in a range from 0.01% to 30% by weight, more preferably in an amount in a range from 0.1% to 20% by weight and even more preferably in an amount in a range from 0.3% to 5% by weight, all percentages being based on the weight of the water-absorbing polymeric formations $P_1$.

The contacting of the outer region of the water-absorbing polymeric formations $P_1$ with the compound comprising the tervalent cations is preferably effected by mixing the water-absorbing polymeric formations $P_1$ with the compound under dry conditions, or alternatively by contacting the water-absorbing polymeric formations $P_1$ with a fluid $F_2$ comprising a solvent, preferably water, a water-miscible organic solvent such as for example methanol or ethanol or a mixture of two or more thereof, and also the compound comprising the tervalent cations, preferably by spraying the polymeric formations with the fluid $F_2$ and mixing. It is further preferred in this context that the contacting of the water-absorbing polymeric formations $P_1$ with the fluid $F_2$ take place in a two-stage process. A two-stage process comprises a first mixing operation, wherein a multiplicity of water-absorbing polymeric formations $P_1$ is mixed with the fluid $F_2$, and a second mixing operation, wherein the fluid $F_2$ is homogenized in the interior of the polymeric formations, the polymeric formations being mixed in the first mixing operation at such a speed that the kinetic energy of the individual polymeric formations is on average greater than the bonding energy between the individual polymeric formations and the polymeric formations being commixed in the second mixing operation at a lower speed than in the first mixing operation.

The treatment of the water-absorbing polymeric formations $P_1$ with the fluid $F_2$ comprising the compound comprising the tervalent cations by the two-stage process described above provides absorbent polymeric formations having improved absorptive properties.

Preference for use as compound comprising tervalent cations is preferably given to a compound comprising $Al^{3+}$ ions, said compound being present in the fluid $F_2$ in an amount which, disregarding water of crystallization, is preferably in a range from 0.1% to 50% by weight and more preferably in an amount in a range from 1% to 30% by weight, each percentage being based on the total weight of fluid $F_2$. It is further preferable that the fluid $F_2$ be contacted with the water-absorbing polymeric formations $P_1$ in an amount in a range from 0.01% to 15% by weight and more preferably in an amount in a range from 0.05% to 6% by weight, all percentages being based on the weight of the water-absorbing polymeric formations $P_1$.

Preferred compounds comprising $Al^{3+}$ ions are $AlCl_3 \times 6H_2O$, $NaAl(SO_4)_2 \times 12 H_2O$, $KAl(SO_4)_2 \times 12 H_2O$ or $Al_2(SO_4)_{3 \times 14}$-18 $H_2O$ or alternatively the corresponding anhydrous salts.

A further embodiment of the process according to the present invention comprises contacting the water-absorbing polymeric formations with further surface-modifying agents before, during or after postcrosslinking. These further surface-modifying agents are in particular surface-active agents such as for example polyvinyl alcohol; inorganic compounds such as for example silicon dioxide powder or silica sol; odour-trapping substances such as for example zeolites or cyclodextrins; or other surface-modifying agents known to one skilled in the art.

The water-absorbing polymeric formations according to the present invention, based on crosslinked carboxyl-bearing monomers, and the water-absorbing polymeric formations $P_2$ obtainable by the process of the present invention are preferably characterized by
  an ERT 442.2-02 (ERT=EDANA Recommended Test) absorption against a pressure of 0.3 psi of at least 20 g/g, preferably at least 26 g/g, more preferably at least 28 g/g and most preferably at least 30 g/g and also
  a thermal stability, as determined in accordance with the test method described herein, of less than 3.0%, preferably less than 2.0%, more preferably less than 1.0% and most preferably less than 0.5%.

The present invention's water-absorbing polymeric formations based on crosslinked carboxyl-bearing monomers and the water-absorbing polymeric formations $P_2$ obtainable by the process of the present invention are further characterized by an ERT 410.2-02 residual monomer content of preferably less than 2000 ppm, more preferably less than 1000 ppm and even more preferably less than 500 ppm. The present invention's water-absorbing polymeric formations based on crosslinked carboxyl-bearing monomers and the water-absorbing polymeric formations $P_2$ obtainable by the process of the present invention are further characterized by an ERT 470.2-02 level of extractable constituents after 16 hours of preferably less than 20% by weight, more preferably less than 15% by weight and even more preferably less than 10% by weight.

It is similarly preferred that the present invention's water-absorbing polymeric formations based on crosslinked carboxyl-bearing monomers and the water-absorbing polymeric formations $P_2$ obtainable by the process of the present invention have a ratio of a retention value (determined as per the test method described herein) to extractables of not less than 2 g/gx %, more preferably of not less than 3 g/gx % and even more preferably of not less than 4 g/gx %, although with a ratio of 20 g/gx %, preferably 15 g/gx % and more preferably 10 g/gx % typically not being exceeded.

Moreover, the present invention's water-absorbing polymeric formations based on crosslinked carboxyl-bearing monomers and the water-absorbing polymeric formations $P_2$ obtainable by the process of the present invention are preferably characterized in that they combine a permeability value (determined as per the test method described herein) of not more than $70 \times 10^{-7}$ cm$^3 \cdot$s$\cdot$g$^{-1}$ with a post-heating at 180° C. for 30 minutes retention value (determined as per the test method described herein) of not less than 27 g/g, preferably not less than 29 g/g and most preferably not less than 31 g/g and a permeability value (determined as per the test method described herein) of more than $70 \times 10^{-7}$ cm$^3 \cdot$s$\cdot$g$^{-1}$ with a post-heating at 180° C. for 30 minutes retention value (determined as per the test method described herein) of not less than 25 g/g, preferably not less than 27 g/g and most preferably not less than 29 g/g, although with a retention of 80 g/g, preferably of 70 g/g and more preferably of 60 g/g typically not being exceeded.

In a particularly preferred embodiment of the present invention's water-absorbing polymeric formations or of the water-absorbing polymeric formations $P_2$ obtainable by the process of the present invention, these are crosslinked by a compound of the aforementioned structure I, more preferably by triallyl isocyanurate, as internal crosslinker, "internal crosslinking" referring to that crosslinking which takes place during the polymerization of the monomers ($\alpha$1) and ($\alpha$2) due to the crosslinker (component ($\alpha$3)) present in the monomer solution (in contradistinction to postcrosslinking, which does not take place until after the polymerization).

It is further preferred in accordance with the present invention that the water-absorbing polymeric formations $P_2$ obtainable by the process of the present invention and the water-absorbing polymeric formations of the present invention have a fraction of particles having a particle size in a range from 300 to 600 μm that is not less than 15% by weight, more preferably not less than 20% by weight, even more preferably not less than 25% by weight, still more preferably not less than 30% by weight and most preferably not less than 35% by weight, all based on the total weight of the water-absorbing polymeric formations.

The present invention's composite comprises the aforementioned water-absorbing polymeric formations or the water-absorbing polymeric formations $P_2$ obtainable by the process of the present invention and a substrate. Preferably, the water-absorbing polymeric formations of the present invention and the substrate are firmly conjointed together. Preferred substrates are self-supporting films composed of polymers, as for example of polyethylene, polypropylene or polyamide, metals, nonwovens, fluff, tissues, wovens, natural or synthetic fibres or other foams.

In accordance with the present invention, sealing materials, cables, absorbent cores and also diapers and hygiene articles comprising absorbent cores are preferred as composite.

The present invention's process for producing a composite comprises contacting the present invention's water-absorbing polymeric formations, or the water-absorbing polymeric formations $P_2$ obtainable by the process of the present invention, and a substrate and if appropriate a suitable auxiliary with one another. The contacting is preferably effected by wet-laid and air-laid processes, compacting, extruding and mixing.

The present invention further provides a composite obtainable by the process described above.

The present invention also provides chemical products, especially foams, mouldings, fibres, self-supporting films, supported films, cables, sealing materials, liquid-absorbing hygiene articles, carriers for plant or fungal growth regulators or active crop protection agents, additives for building materials, packaging materials or soil additives comprising the present invention's water-absorbing polymeric formations, the water-absorbing polymeric formations $P_2$ obtainable by the process of the present invention, the composite described above or the composite obtainable by the process described above. These chemical products, compared with conventional chemical products comprising water-absorbing polymeric particles, are notable in particular for a reduced level of soluble fractions, especially of residual monomers.

The present invention also provides for the use of the present invention's water-absorbing polymeric formations, of the water-absorbing polymeric formations $P_2$ obtainable by the process of the present invention, of the composite or of the composite obtainable by the process described above, in chemical products, in particular in hygiene products, for flood control, for insulation against water, for regulating the water content of soils or for treating foodstuffs.

Finally, the present invention also provides for the use of compounds of the structure I

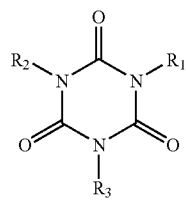

Structure I where $R_1$, $R_2$ and $R_3$ may be the same or different and represent an ethylenically unsaturated hydrocarbon having 2 to 20 carbon atoms which may be attached, if appropriate via a polyethylene oxide or polypropylene oxide group having 1 to 200, preferably 10 to 150 and more preferably 20 to 100 ethylene oxide and propylene oxide, respectively, units, to the nitrogen atom, preferably 3 to 15 carbon atoms and more preferably 3 to 6 carbon atoms, for producing water-absorbing polymeric particles having improved hydrolytic stability or for reducing skin irritation for a mammal, preferably a human. These skin irritations shall preferably be reduced in relation to the wearing of hygiene articles, especially baby and toddler diapers, sanitary napkins and adult incontinence articles comprising water-absorbing polymeric particles.

It is particularly preferable in this connection that the compounds of the structure I be used as an internal crosslinker in the production of water-absorbing polymeric formations based on crosslinked carboxyl-bearing monomers and having an ERT 442.2-02 absorption against a pressure of 0.3 psi of at least 26 g/g, preferably at least 28 g/g and even more preferably at least 30 g/g.

The invention will now be more particularly described with reference to test methods and nonlimiting examples.

Test Methods

Determination of Retention

Retention is determined for the water-absorbing polymeric formations by the so-called teabag test. A 0.9% by weight NaCl solution is used as test solution.

About 1 g of water-absorbing polymeric formations is weighed out ($W_1$) and sealed into a teabag. The teabag is placed in the test solution for 30 minutes and subsequently whizzed in a hydroextractor (23 cm in diameter, 1400 rpm) for 3 minutes and reweighed ($W_2$). A teabag without water-absorbing polymeric formations whose weight is likewise determined after whizzing ($W_3$) provides the blank value. The retention was reported in g/g and calculated as follows:

$$\text{Retention}[g/g] = \frac{W_2 - W_3 - W_1}{W_1}$$

Determination of Thermal Stability

Thermal stability is determined for the polymeric formations by first determining the retention value of a portion of the in-test polymeric formations by the method described above (=retention$_{(before\ heating)}$).

Subsequently, a further portion of the polymeric formations was spread out in a monolayer on a metal dish. This metal dish was subsequently placed for 30 minutes in a preheated circulating air oven at 180° C. After 30 minutes, the metal dish was removed from the oven and the polymeric formations were allowed to cool down to room temperature. Then, retention was redetermined by the test method described above (=retention$_{(after\ heating)}$).

Determination of SFC Value

Saline Flow Conductivity (SFC) as a measure of permeability in the swollen state is determined by a method described in WO 95/22356. About 0.9 g of superabsorbent polymer material (the entire fraction of particles) is weighed into a cylinder equipped with a screen bottom, and is carefully distributed over the screen surface. The superabsorbent polymer material is allowed to swell in JAYCO synthetic urine for 1 hour against a pressure of 20 g/cm². After the thickness of the swollen superabsorbent polymer has been measured, 0.118 M NaCl solution is added, at a stable hydrostatic pressure, from an elevated stock reservoir vessel and is allowed to pass through the swollen layer of gel. The swollen layer of gel during the measurement is covered with a specific screen cylinder which ensures an even distribution of the 0.118 M NaCl solution above the gel and constant conditions (measuring temperature 20-25° C.) during the measurement with regard to gel bed constitution. The pressure acting on the swollen superabsorbent continues to be 20 g/cm². A computer and a balance are used to capture the amount of liquid which the gel layer transmits as a function of time, at intervals of 20 seconds within a period of 10 minutes. The flow rate in g/s through the swollen layer of gel is determined by regression analysis with extrapolation of the slope and determination of the mid-point to the time t=0 of the flow rate within the minutes 2-10. The SFC value (K) was reported in $cm^3 \cdot s \cdot g^{-1}$ and calculated as follows:

$$K = \frac{F_s(t=0) \cdot L_0}{r \cdot A \cdot \Delta P_1} = \frac{F_s(t=0) \cdot L_o}{139506}$$

where $F_s(t=0)$ is the flow rate in g/s,
$L_o$ is the thickness of the gel layer in cm,
r is the density of the NaCl solution (1.003 g/cm³),
A is the area of the upper surface of the gel layer in the measuring cylinder (28.27 cm²),
$\Delta P$ is the hydrostatic pressure on the gel layer (4920 dyne/cm²), and
K is the SFC value.

EXAMPLES

Example 1

Preparation of a Water-Absorbing Polymeric Particle $P_1$:

A monomer solution consisting of 280.0 g of acrylic acid, 217.6 g of NaOH (50%), 469.7 g of water and 0.280 g (0.1% by weight, based on acrylic acid used) of triallyl isocyanurate is purged with nitrogen to remove dissolved oxygen and cooled down to the starting temperature of 4° C. On reaching the starting temperature, the initiator solution (0.1 g of 2,2'-azobis-2-amidinopropane dihydrochloride in 10 g of $H_2O$, 0.3 g of sodium peroxydisulphate in 10 g of $H_2O$, 0.07 g of 35% hydrogen peroxide solution in 1 g of $H_2O$ and 0.015 g of ascorbic acid in 2 g $H_2O$) was added. On reaching the final temperature of about 90° C., the gel formed was comminuted and dried at 150° C. for 120 minutes. The dried polymer was coarsely crushed, ground in an SM 100 cutting mill to a particle size of less than 2000 μm and sized to a powder having a particle size in the range from 150 to 850 μm by passing through a series of screens.

The powder A obtained had a residual monomer content of 260 ppm, a solubles content of 17.8% and a retention of 44.5 g/g.

Example 2

Preparation of a Water-Absorbing Polymeric Particle $P_1$:

Example 1 was repeated using 0.840 g (0.3% by weight) of triallyl isocyanurate instead of just 0.280 g of triallyl isocyanurate. The amount of water was reduced to 469.1 g.

The powder B obtained had a residual monomer content of 480 ppm, a solubles content of 11.1% and a retention of 38.3 g/g.

Comparative Example 1

Preparation of a Water-Absorbing Polymeric Particle $P_1$

Example 1 was repeated except that 0.903 g of polyethylene glycol 300 diacrylate (having an active content of 77.5% by weight) was used as crosslinker instead of triallyl isocyanurate. The amount of water was reduced to 469.0 g.

The powder C obtained had a residual monomer content of 1180 ppm, a solubles content of 14.0% and a retention of 41.8 g/g.

Comparative Example 2

Preparation of a Water-Absorbing Polymeric Particle $P_1$

Comparative Example 2 was repeated except that 1.265 g of polyethylene glycol 300 diacrylate were used instead of just 0.903 g.

The powder D obtained had a residual monomer content of 1840 ppm, a solubles content of 10.4% and a retention of 36.8 g/g.

It is clear from Examples 1 and 2 and Comparative Examples 1 and 2 that the use of triallyl isocyanurate in contrast to polyethylene glycol 300 diacrylate leads to water-absorbing polymeric particles having a distinctly reduced residual monomer content. This reduced residual monomer content must be ascribed to an increased hydrolytic stability on the part of the polymeric particles.

Example 3

Thermal Exposure of Water-Absorbing Polymeric Particles

The powders A, B, C and D were heated in an oven at 180° C. for 30 minutes. This thermal exposure corresponds to the thermal exposure encountered in the postcrosslinking of water-absorbing polymeric particles for example.

After heating, retention was redetermined. The following measurements were obtained:

TABLE 1

|  | Retention$_{before\ heating}$ | Retention$_{after\ heating}$ | Thermal stability |
|---|---|---|---|
| Powder A | 44.5 g/g | 44.7 g/g | 0.45% |
| Powder B | 38.3 g/g | 38.3 g/g | 0% |
| Powder C | 41.8 g/g | 44.2 g/g | 5.7% |
| Powder D | 36.8 g/g | 38.0 g/g | 3.2% |

Table 1 above reveals that the use of triallyl isocyanurate as a crosslinker leads to an increase in the hydrolytic stability of the polymers when exposed to a thermal load, as is discernible from the lower increase in the retention due to the thermal load. Subjecting polymers crosslinked with triallyl isocyanurate to postcrosslinking would result in reduced hydrolysis and thus also in a lower level of residual monomers and other, soluble constituents.

Example 4

The powders A, B, C and D were surface postcrosslinked by, in each case, 100 g of the corresponding powder being mixed with a total of 4 g of an aqueous solution consisting of 1 g of ethylene carbonate and 3 g of water in a laboratory mixer and subsequently being heated in an oven to 180° C. for a period of 30 minutes. The resulting postcrosslinked powders A to D were measured for absorbency against a pressure of 0.3 or 0.7 psi and also for retention. The results are reported below in Table 2:

TABLE 2

|  | Retention | AAP (0.3 psi) | AAP (0.7 psi) |
|---|---|---|---|
| Powder A (post-crosslinked) | 30.2 g/g | 29.9 g/g | 23.2 g/g |
| Powder B (post-crosslinked) | 29.0 g/g | 30.1 g/g | 24.1 g/g |
| Powder C (post-crosslinked) | 33.8 g/g | 31.8 g/g | 24.4 g/g |
| Powder D (post-crosslinked) | 31.6 g/g | 31.0 g/g | 24.4 g/g |

The invention claimed is:

1. A process for producing postcrosslinked water-absorbing polymeric formations, comprising the steps of:
    a) contacting water-absorbing polymeric formations $P_1$, obtained by polymerization of ethylenically unsaturated acid-functional monomers or salts thereof in the presence of a triallyl isocyanurate crosslinker, with a fluid $F_1$ comprising a postcrosslinker;
    b) heating the water-absorbing polymeric formations $P_1$ in contact with the fluid $F_1$ to a temperature in a range from 40 to 300° C. to obtain postcrosslinked water-absorbing polymeric formations $P_2$;

wherein the water-absorbing polymeric formations $P_1$ have a thermal stability of less than 3.0%.

2. The process of claim 1, wherein the water-absorbing polymeric formations $P_1$ have a thermal stability of less than 2.0%.

3. The process of claim 1, wherein the water-absorbing polymeric formations $P_1$ have a thermal stability of less than 1.0%.

4. The process of claim 1, wherein the water-absorbing polymeric formations $P_1$ have a thermal stability of less than 0.5%.

5. The process of claim 1, wherein said water-absorbing polymeric formations $P_1$ are obtained in the absence of surface-active agents.

6. The process of claim 1, wherein the surface of said water-absorbing polymeric formations $P_1$ is contacted with a tervalent cation before, during or after postcrosslinking.

7. The process of claim 1, wherein said ethylenically unsaturated acid-functional monomer, are acrylic acid.

8. A process for producing postcrosslinked water-absorbing polymeric formations, comprising the steps of:
    a) producing water-absorbing polymeric formations $P_1$ by polymerizing ethylenically unsaturated acid-functional monomers or salts thereof in the presence of a triallyl isocyanurate crosslinker,
    b) drying the water-absorbing polymeric formations of step a) at a temperature in the range of 80 to 200° C.;
    c) contacting the dried water-absorbing polymeric formations produced in step b) with a fluid $F_1$ comprising a postcrosslinker at a temperature in a range from 40 to 300° C. to obtain postcrosslinked water-absorbing polymeric formations $P_2$;

wherein the water-absorbing polymeric formations $P_1$ have a thermal stability of less than 3.0%.

9. The process of claim 8, wherein the water-absorbing polymeric formations $P_1$ have a thermal stability of less than 2.0%.

10. The process of claim 8, wherein the water-absorbing polymeric formations $P_1$ have a thermal stability of less than 1.0%.

11. The process of claim 8, wherein the water-absorbing polymeric formations $P_1$ have a thermal stability of less than 0.5%.

12. The process of claim 8, wherein said water-absorbing polymeric formations $P_1$ are obtained in the absence of surface-active agents.

13. The process of claim 8, wherein the surface of said water-absorbing polymeric formations $P_1$ is contacted with a tervalent cation before, during or after postcrosslinking.

14. A process for producing postcrosslinked water-absorbing polymeric formations, comprising the steps of:

a) producing water-absorbing polymeric formations $P_1$, by polymerizing compounds of structure I:

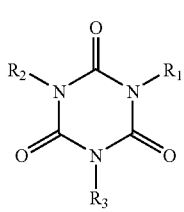

Structure I wherein $R_1$, $R_2$ and $R_3$ may be the same or different and represent an ethylenically unsaturated hydrocarbon having 2 to 20 carbon atoms;

b) contacting the dried water-absorbing polymeric formations produced in step a) with a fluid $F_1$ comprising a postcrosslinker at a temperature in a range from 40 to 300° C. to obtain postcrosslinked water-absorbing polymeric formations $P_2$;

wherein the water-absorbing polymeric formations $P_1$ have a thermal stability of less than 3.0%.

15. The process of claim 14, wherein the water-absorbing polymeric formations $P_1$ have a thermal stability of less than 2.0%.

16. The process of claim 14, wherein the water-absorbing polymeric formations $P_1$ have a thermal stability of less than 1.0%.

17. The process of claim 14, wherein the water-absorbing polymeric formations $P_1$ have a thermal stability of less than 0.5%.

18. The process of claim 14, wherein said water-absorbing polymeric formations $P_1$ are obtained in the absence of surface-active agents.

19. The process of claim 14, wherein the surface of said water-absorbing polymeric formations $P_1$ is contacted with a tervalent cation before, during or after postcrosslinking.

* * * * *